W. V. V. WILSON.
Pill Machine.
No. 66,199.
Patented June 25, 1867.
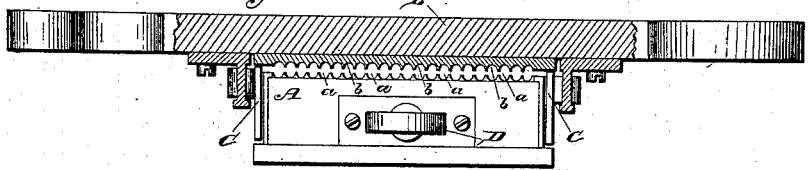
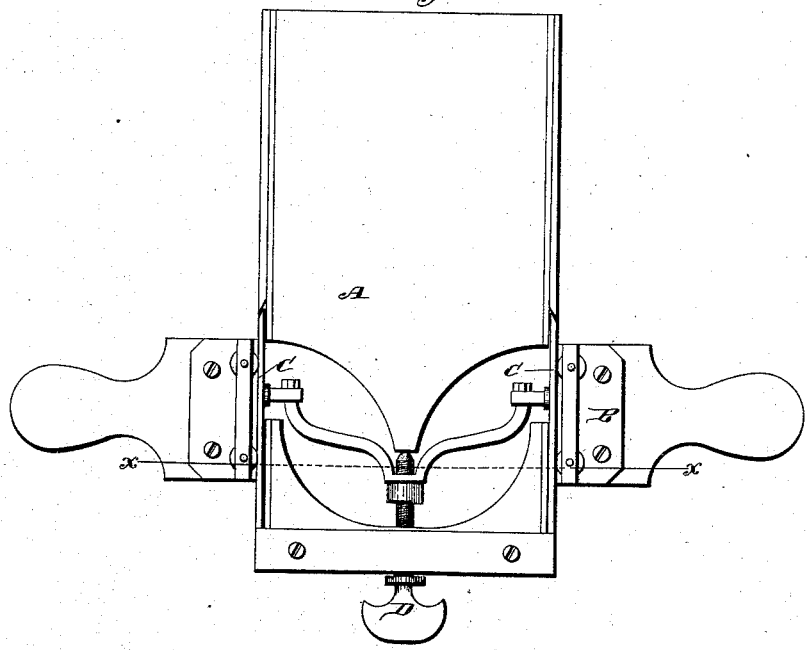
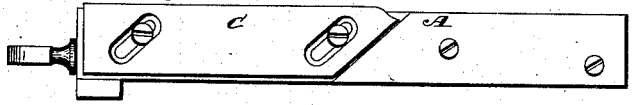
Witnesses:
Theo Fusch
Wm Truwn
Inventor:
W V V Wilson
Per Munn & Co
Attorneys

United States Patent Office.

WILLIAM V. V. WILSON, OF SAVANNAH, GEORGIA.

Letters Patent No. 66,199, dated June 25, 1867; antedated June 21, 1867.

IMPROVEMENT IN PILL MACHINES.

*The Schedule referred to in these Letters Patent and making part of the same.*

TO ALL WHOM IT MAY CONCERN:

Be it known that I, W. V. V. WILSON, of Savannah, in the county of Chatham, and State of Georgia, have invented a new and improved Pill Machine; and I do hereby declare that the following is a full, clear, and exact description thereof, which will enable others skilled in the art to make and use the same, reference being had to the accompanying drawings, forming a part of this specification, in which—

Figure 1 represents a transverse section of this invention, the line $x\ x$, fig. 3, indicating the plane of section.

Figure 2 is a side elevation of the same.

Figure 3 is an inverted plan of the same.

Similar letters of reference indicate like parts.

This invention consists in the arrangement of adjustable rails on the sides of the board of a pill machine in such a manner that said rails can be raised or lowered to correspond to the diameter of the pills to be produced, and the rolling of the dough is materially facilitated.

A represents the board of a pill machine, one portion of which serves to roll out the dough, while its other portion is occupied by a series of semi-cylindrical channels, $a$, which, in combination with similar channels $b$ on the rubber B, serve to cut the sticks of dough into pills. The rubber B extends over the edges of the board A, and the flat back of said rubber serves to roll out the dough on the board. With ordinary pill machines the proper rolling depends entirely upon the skill of the operator, and it requires great practice to produce sticks of uniform thickness throughout. This difficulty is obviated by the application of adjustable rails C to the edges of the board A. These rails are raised or lowered simultaneously by a hand-screw, D, and they support the rubber B. By these means the distance of said rubber from the surface of the board can be adjusted, and sticks of a uniform thickness throughout can be produced without difficulty.

What I claim as new, and desire to secure by Letters Patent, is—

The adjustable rails C, in combination with the board A and rubber B, substantially as and for the purpose described.

The above specification of my invention signed by me this 20th day of September, 1866.

WM. V. V. WILSON.

Witnesses:
WM. F. McNAMARA,
W. HAUFF.